United States Patent
Bates et al.

(10) Patent No.: US 6,735,347 B1
(45) Date of Patent: May 11, 2004

(54) METHOD AND APPARATUS FOR TEXT EXTRACTION FROM CUT IMAGE

(75) Inventors: Cary L. Bates, Rochester, MN (US); Paul R. Day, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 09/634,454

(22) Filed: Aug. 8, 2000

(51) Int. Cl.7 .............................. G06K 9/20; G06K 9/36
(52) U.S. Cl. ..................... 382/282; 382/190; 382/284; 382/315; 358/405; 358/474; 358/505; 345/724; 345/770
(58) Field of Search ................................. 382/113, 135, 382/137–140, 142, 143, 164, 170, 171, 174, 175–177, 179, 187, 190, 198, 229, 231, 277, 282, 284, 294, 307, 311, 317, 321, 315, 318, 319; 358/401, 403, 450, 537, 538, 540, 405, 505, 474, 1.12; 345/723, 724, 770, 776, 781, 769, 771

(56) References Cited

U.S. PATENT DOCUMENTS

| | | | | |
|---|---|---|---|---|
| 4,743,747 A | * | 5/1988 | Fougere et al. | ............. 235/494 |
| 5,054,096 A | * | 10/1991 | Beizer | ........................ 382/305 |
| 5,436,735 A | * | 7/1995 | Tanabe et al. | ............... 358/453 |
| 5,548,416 A | * | 8/1996 | Kanemitsu et al. | ......... 358/470 |
| 5,594,850 A | * | 1/1997 | Noyama et al. | ............. 345/632 |
| 6,249,283 B1 | * | 6/2001 | Ur | .............................. 345/764 |
| 6,343,149 B1 | * | 1/2002 | Motoiwa | ..................... 382/209 |

* cited by examiner

Primary Examiner—Timothy M. Johnson
Assistant Examiner—Yosef Kassa
(74) Attorney, Agent, or Firm—Schmeiser Olsen & Watts, LLP (57) ABSTRACT

The preferred embodiment of the present invention provides a method and apparatus for copying images from a source document to a destination document in a computer user interface. The preferred embodiment provides a user interface that gives the user the option to cut or copy information from an image and extract the textual information from the copied image in one cut and paste. The extracted text can then be pasted into the destination document as text. Thus, textual information from an image can easily and automatically be copied into text portions of the destination document. Alternatively, the image with the text removed can be copied into the destination in one cut and paste operation.

36 Claims, 7 Drawing Sheets

METHOD AND APPARATUS FOR TEXT EXTRACTION FROM CUT IMAGE

BACKGROUND OF THE INVENTION

1. Technical Field

The present invention relates in general to user interfaces for computers. More specifically, the present invention relates to cut and paste tools in computer user interfaces.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Early computer systems required an extensive knowledge of commands for a user to perform any type of function. These computers employed what is known as a command line in which a specific command would have to be entered to perform just about any type of operation. This limited the use of computers to those who had the time to learn a large number of relatively cryptic commands.

Later computer systems used a more advanced user interface to make it easier for a computer user to perform functions without knowledge of specific commands. The most common modern interface is the graphical user interface, or GUI. A GUI uses some type of symbol, menu or other mechanism which is activated by a computer user with a pointing device (e.g., a mouse, a trackball) to perform many commonly performed tasks. These graphical mechanisms are usually designed to be somewhat consistent and self-explanatory to make it as easy as possible for a user to perform common functions.

One common ability provided by user interfaces is the ability to "cut and paste" data from one document to another. This is typically done by a user selecting a portion of the source document using a pointing device or keyboard, and then activating a "cut" command. The cut command copies the highlighted portion of the document to a portion of memory, commonly referred to as a "clipboard". The user then moves to the destination document, moves the cursor to the desired location, and then activates the "paste" command. The user interface then takes the data from the clipboard and inserts it into the desired location on the destination document.

Unfortunately, there are limitations to current cut and paste technologies. First, when a user wants to cut and paste an image that has lettering or words in it, such as a logo, and wants only the image without the logo, the only means to do that today is by opening an image editor on the image and manually editing the image (sometimes pixel by pixel) in a laborious exercise.

Second, when a user attempts to cut an item that appears to be text, but is in fact an image, the cut and paste will result in the image being inserted into the destination document, in image format such as .jpg or .gif, instead of as text. For example, when a web browser user attempts to cut from a web page in which the "text" is really an image file illustrating text, the paste operation will not result in the copying of the desired information in text format that can be manipulated using a word processor or otherwise inserted into other text strings. Thus, the user is required to manually type in text information displayed in the web page image or otherwise manually reproduce the information.

Therefore, without improved mechanisms for cutting and pasting images from one document to another, users will continue to be forced to rely on manual, time consuming methods for copying images and manually transforming the images to meet their needs.

SUMMARY OF THE INVENTION

The preferred embodiment of the present invention provides a method and apparatus for copying images from a source document to a destination document in a computer user interface. The preferred embodiment provides a user interface that gives the user the option to cut or copy information from an image and extract the textual information from the copied image in one cut and paste. The extracted text can then be pasted into the destination document as text. Thus, textual information from an image can easily and automatically be copied into text portions of the destination document. Alternatively, the image with the text removed can be copied into the destination in one cut and paste operation.

In the preferred embodiment, the textual information is extracted from copied images using optical character recognition (OCR) techniques. Thus, when activated by a user, the user interface copies the image, OCR's the image to locate the textual information, and then pastes the located textual information when directed by the user.

In an additional embodiment, the user interface automatically performs the textual extraction and paste when a user attempts to paste into a document or field designated as a text only field. Thus, the user interface facilitates the automatic copying and pasting of textual information from image information, without requiring input and direction from the user.

In an additional embodiment, the textual symbols are extracted from the image, so that only the non-textual portions of the image remain. The portions of the image in which the extracted text is removed can then be dithered over using the surrounding color pixels to effectively erase out the text. The image with the text removed is then pasted into the destination document.

DESCRIPTION OF THE PREFERRED EMBODIMENTS

The preferred embodiment of the present invention provides a method and apparatus for copying images from a source document to a destination document in a computer user interface. The preferred embodiment provides a user interface that gives the user the option to cut or copy information from an image and extract the textual information from the copied image in one cut and paste operation. The extracted text can then be pasted into the destination document as text. Thus, textual information from an image can easily and automatically be copied into text portions of the destination document. Alternatively, the image with the text removed can be copied into the destination in one cut and paste operation.

In the preferred embodiment, the textual information is extracted from copied images using optical character recognition (OCR) techniques. Thus, when activated by a user, the user interface copies the image, OCR's the image to locate the textual information, and then pastes the located textual information when directed by the user.

In an additional embodiment, the user interface automatically performs the textual extraction and paste when a user attempts to paste into a document or field designated as a text only field. Thus, the user interface facilitates the automatic copying and pasting of textual information from image information, without requiring input and direction from the user.

In an additional embodiment, the textual symbols are extracted from the image, so that only the non-textual portions of the image remain. The portions of the image in which the extracted text is removed can then be dithered over using the surrounding color pixels to effectively erase out the text. The image with the text removed is then pasted into the destination document.

Figure 1:
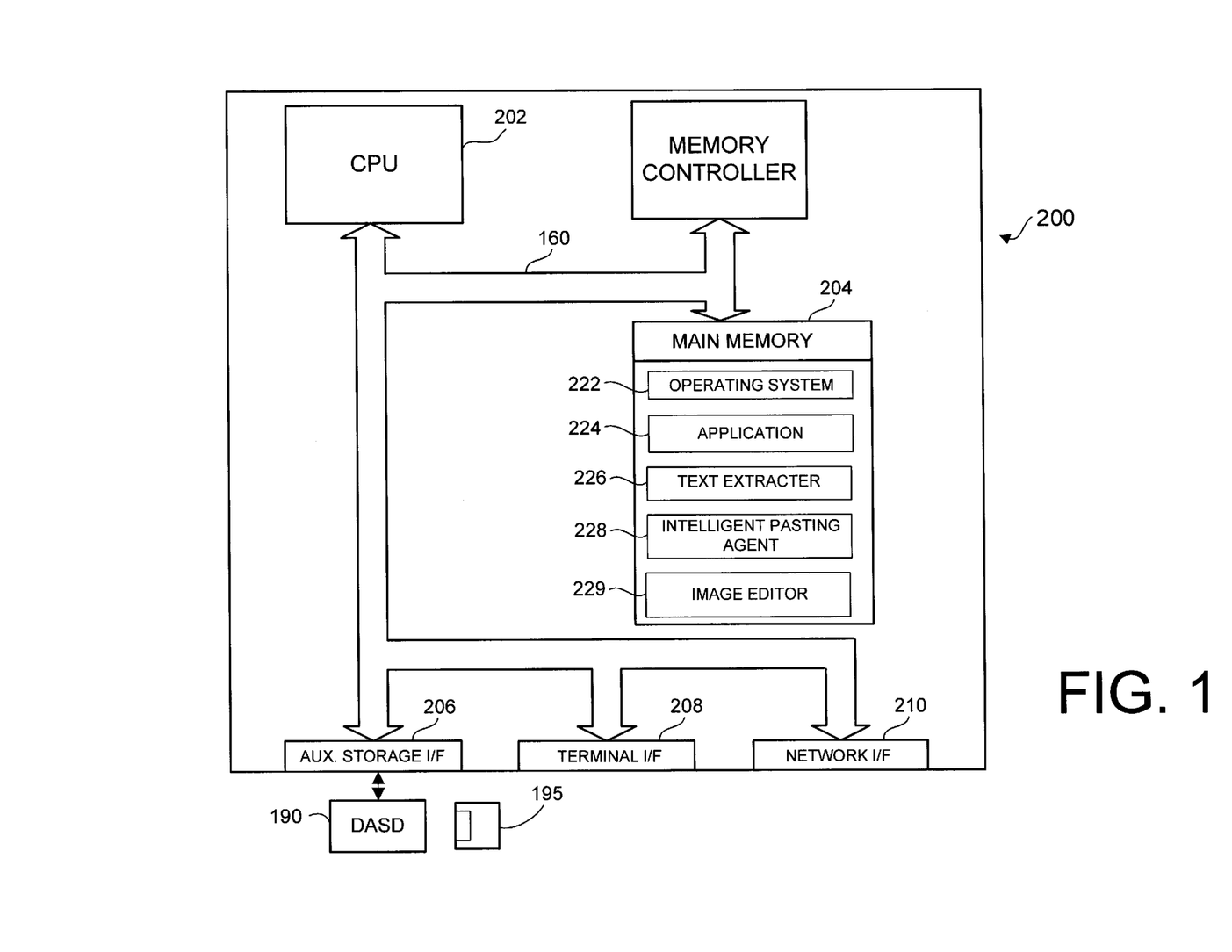
FIG. 1 is a block diagram view of a computer system in accordance with the preferred embodiment.

Referring now to FIG. 1, a block diagram of a computer system 200 is shown to illustrate a preferred embodiment of the present invention. The computer system 200 can be any suitable system, such as an IBM compatible personal computer, a Unix workstation, or a network computer. However, those skilled in the art will appreciate that the mechanisms and apparatus of the present invention apply equally to any computer system, regardless of whether the computer system is a complicated multi-user computing apparatus or a single user personal computer. As shown in the block diagram of FIG. 1, computer system 200 comprises main or central processing unit (CPU) 202 connected to main memory 204, auxiliary storage interface 206, terminal interface 208, and network interface 210. These system components are interconnected through the use of a system bus 160. Auxiliary storage interface 206 is used to connect mass storage devices (such as DASD devices 190 which stores data on a disk 195) to computer system 200.

Main memory 204 contains an operating system 222 and an application 224. In accordance with the preferred embodiment the main memory will also include a text extractor 226, an intelligent pasting agent 228, and a image editor 229. The text extractor 226 provides the ability to determine textual information from the image. The intelligent pasting agent 228 provides for automatic extraction of textual information and pasting of the extracted textual information when a paste operation is performed into a portion of a document designated as text only. The image editor 229 provides the ability to automatically dither over portions of copied images where text has been removed prior to pasting. In the preferred embodiment, the text extractor 226, intelligent pasting agent 228 and image editor 229 are provided as part of the user interface of computer system 200. As such, they may be implemented as part of operating system 222, as part of application 224, as independent applications, or as a combination thereof. Preferably, the text extractor 226, intelligent pasting agent 228 and image editor 229 are implemented system wide such that images can be copied from a document in one application and then intelligently pasted into a new document in a second application. For example, an image can be copied from a word processor, and the extracted text pasted into a text only field viewed on a web browser. Likewise, an image with text could be copied from a web browser and the modified image with the text removed pasted into a document opened by a word processor.

Computer system 200 preferably utilizes well known virtual addressing mechanisms that allow the programs of computer system 200 to behave as if they only have access to a large, single storage entity instead of access to multiple, smaller storage entities such as main memory 204 and DASD devices. Therefore, while operating system 222, application 224, text extractor 226, intelligent pasting agent 228 and image editor 229 are shown to reside in main memory 204, those skilled in the art will recognize that these programs are not necessarily all completely contained in main memory 204 at the same time. It should also be noted that the term "memory" is used herein to generically refer to the entire virtual memory of computer system 200.

Although computer system 200 is shown to contain only a single main CPU and a single system bus, those skilled in the art will appreciate that the present invention may be practiced using a computer system that has multiple CPUs and/or multiple buses.

Terminal interface 208 is used to directly connect one or more terminals to computer system 200. These terminals may be non-intelligent or fully programmable workstations, and are used to allow system administrators and users to communicate with computer system 200.

Network interface 210 is used to connect other computer systems and/or workstations to computer system 200 in networked fashion. For example, the network interface can include a connection to the Internet and the World-Wide-Web or internal web-based systems (typically called intranets). The present invention applies equally no matter how computer system 200 may be connected to other computer systems and/or workstations, regardless of whether the connection is made using present-day analog and/or digital techniques or via some networking mechanism of the future.

Operating system 222 can be any operating system, such as Unix, OS/2, Windows, AIX, OS/400, Palm OS, etc, but is preferably an operating system that provides a graphical user interface, and those skilled in the art will appreciate that the spirit and scope of the present invention is not limited to any one operating system.

Application program 224 can be any type of application program which provides a view to any type of document. Thus, the application could comprise a word processing program, a spreadsheet program, or a graphics program. It can also comprise a browser type application used to view documents on the internet. It should also be noted that the term "document," when used in this specification can include any type of computer displayed data, such as text, graphics, tables, audio, multimedia or any combination thereof.

The preferred embodiment text extractor 226, intelligent pasting agent 228 and image editor 229 provide a system and method that gives the user the option to cut or copy an information from an image or other data type and extract the textual information from the copied data. The extracted text can then be pasted into the destination document as text. Thus, textual information from the image and other portions of source documents can easily and automatically be copied into text portions of the destination document. Alternatively, the text can be removed from the image and the modified image pasted without the text.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of a particular type of signal bearing media used to actually carry out the distribution. Examples of signal bearing media include: recordable type media such as floppy disks, CD-ROMs and transmission type media such as digital and analog communication links.

Figure 2:
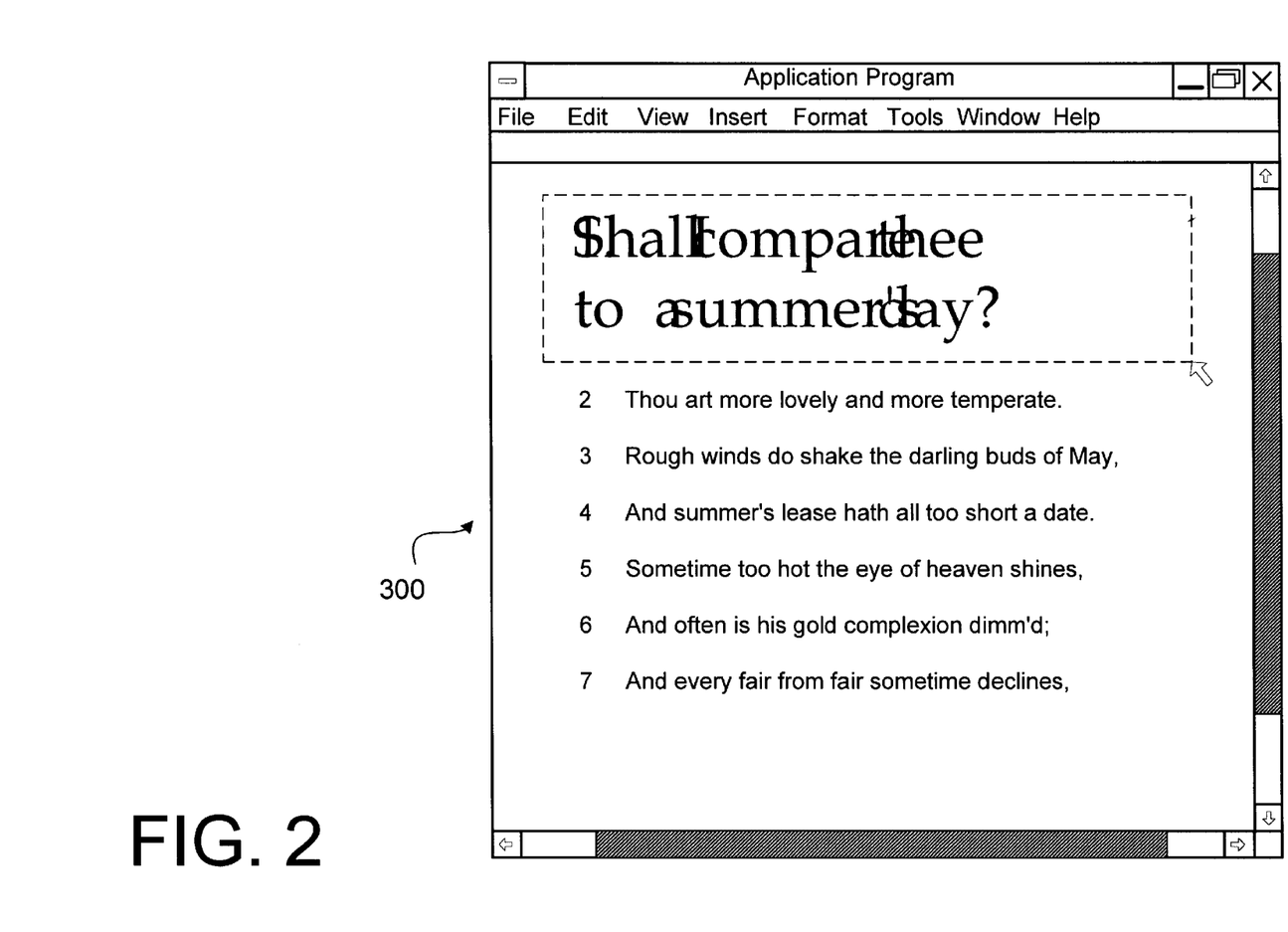
FIGS. 2–7 are schematic illustrations of user interfaces in accordance with the preferred embodiment.

Turning to FIG. 2 an exemplary user interface 300 is shown that incorporates a text extractor and intelligent pasting agent in accordance with the preferred embodiment. Specifically, FIG. 2 illustrates how an application program is used to copy or cut data from a source document. In FIG. 2, the user is attempting to copy the phrase "1. Shall I compare thee to a summer's day?" by drawing a selection box around the phrase, and then copying or cutting the selected material. As with conventional systems, the user performs a cut or copy by selecting the material, typically with a pointing device such as a mouse. The "cut" or "copy" command is then activated by using the proper keystroke, pull down menu, and/or pointing device button. The selected data is then copied into the memory buffer for this purpose, sometimes referred to as a "clipboard."

In the example illustrated in FIG. 2, the desired phrase is actually an image of the phrase rather than a textual representation of the phrase. This situation is a common occurrence in applications where images are used as specialized textual representations. For example, an internet web site might use images to display words and phrases in fonts and/or colors that are not otherwise available in standard textual documents. The user may or may not realize that the desired phrase is in fact an image rather than a textual element. In accordance with the preferred embodiment, the text extractor and intelligent pasting agent provide the ability to convert and paste the textual information contained within the image easily and automatically.

Figure 3:
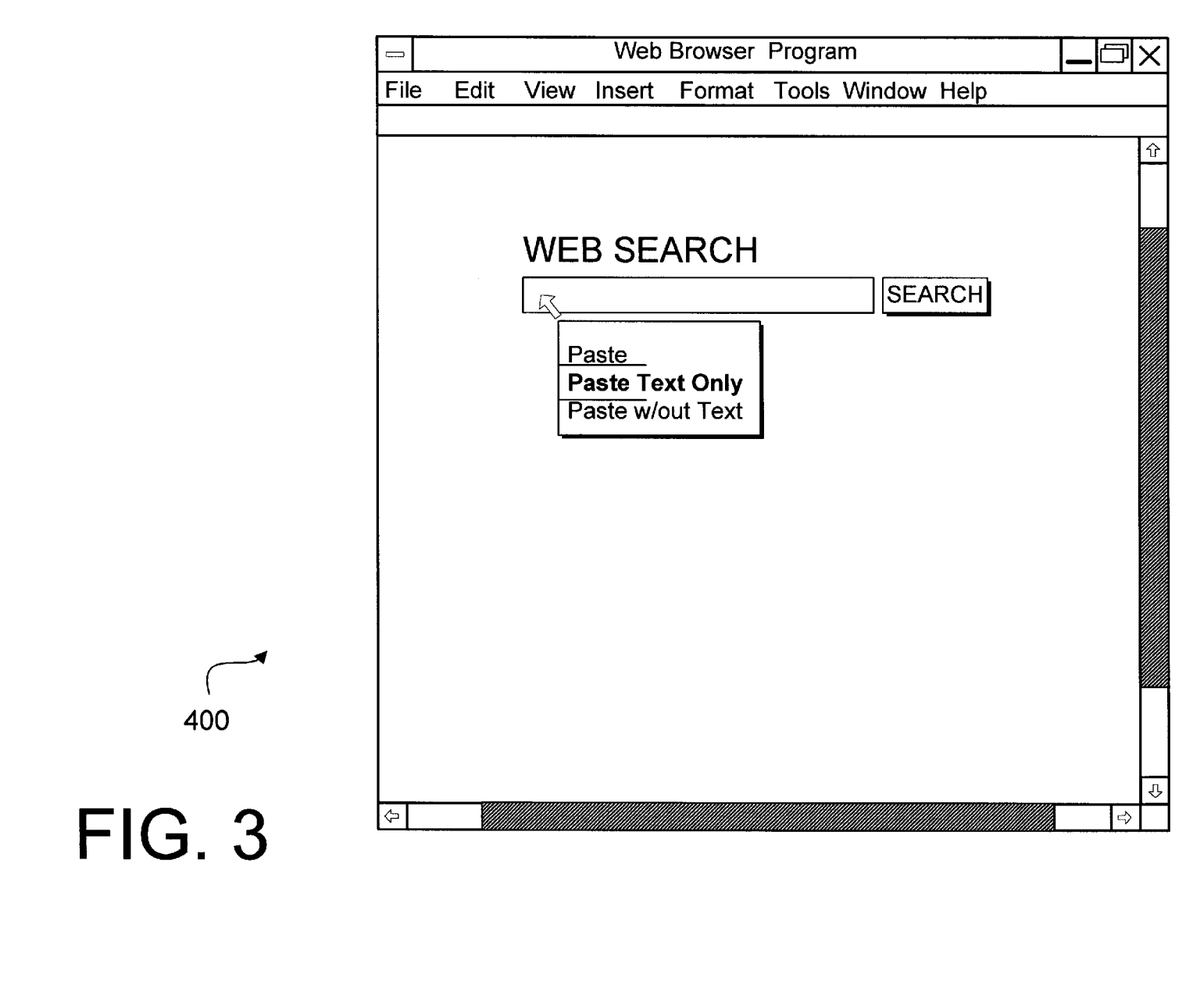

Turning now to FIG. 3, a user interface 400 belonging to a web browser application is illustrated. In this example, the user is attempting to paste the copied data into a text input field on a web search page. In a conventional system, such a paste would fail as the copied image would be incompatible with the text input field. In the preferred embodiment however, the text extractor and intelligent pasting agent provide the ability to paste the textual information from the copied image. In the illustrated example, a pop-up menu is illustrated given the user the ability to select a normal "Paste", a "Paste Text", or a "Paste w/out Text" command. When the "Paste Text" command is selected, the text extractor of the preferred embodiment performs an Optical Character Recognition (OCR) of the stored image. This OCR locates and determines the content of any text that is within the image itself. The intelligent pasting agent then pastes the extracted textual information into the input field. Thus, the user is able to copy textual information from an image in a document and paste the textual information in text form.

Figure 4:
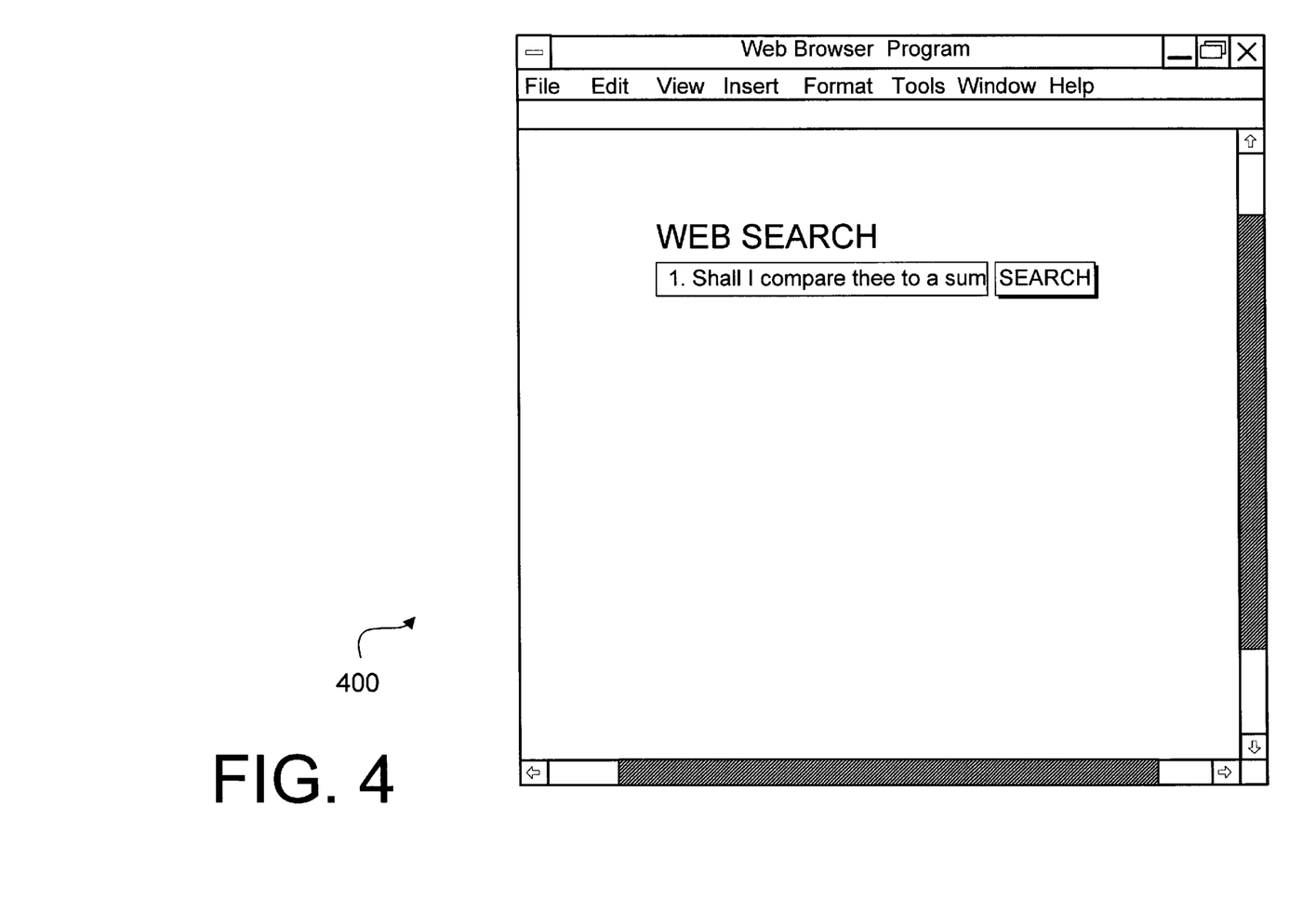

Turning now to FIG. 4, the user interface 400 is illustrated after the textual information has been copied into the search field by the preferred embodiment of the present invention. In an alternative to the embodiment illustrated in FIG. 3, instead of giving the user the option to select "Paste" or "Paste Text" the intelligent pasting agent automatically determines the type of destination in which the copied image is to be pasted. If the intelligent pasting agent determines the destination is limited to text only, the text extractor automatically determines the textual information and the pasting agent automatically pastes the text information instead of the copied image. For example, if a paste is performed into a text only input field, or into a text only word processor, the preferred embodiment will perform the text extraction and copy the text instead of the image.

Figure 5:
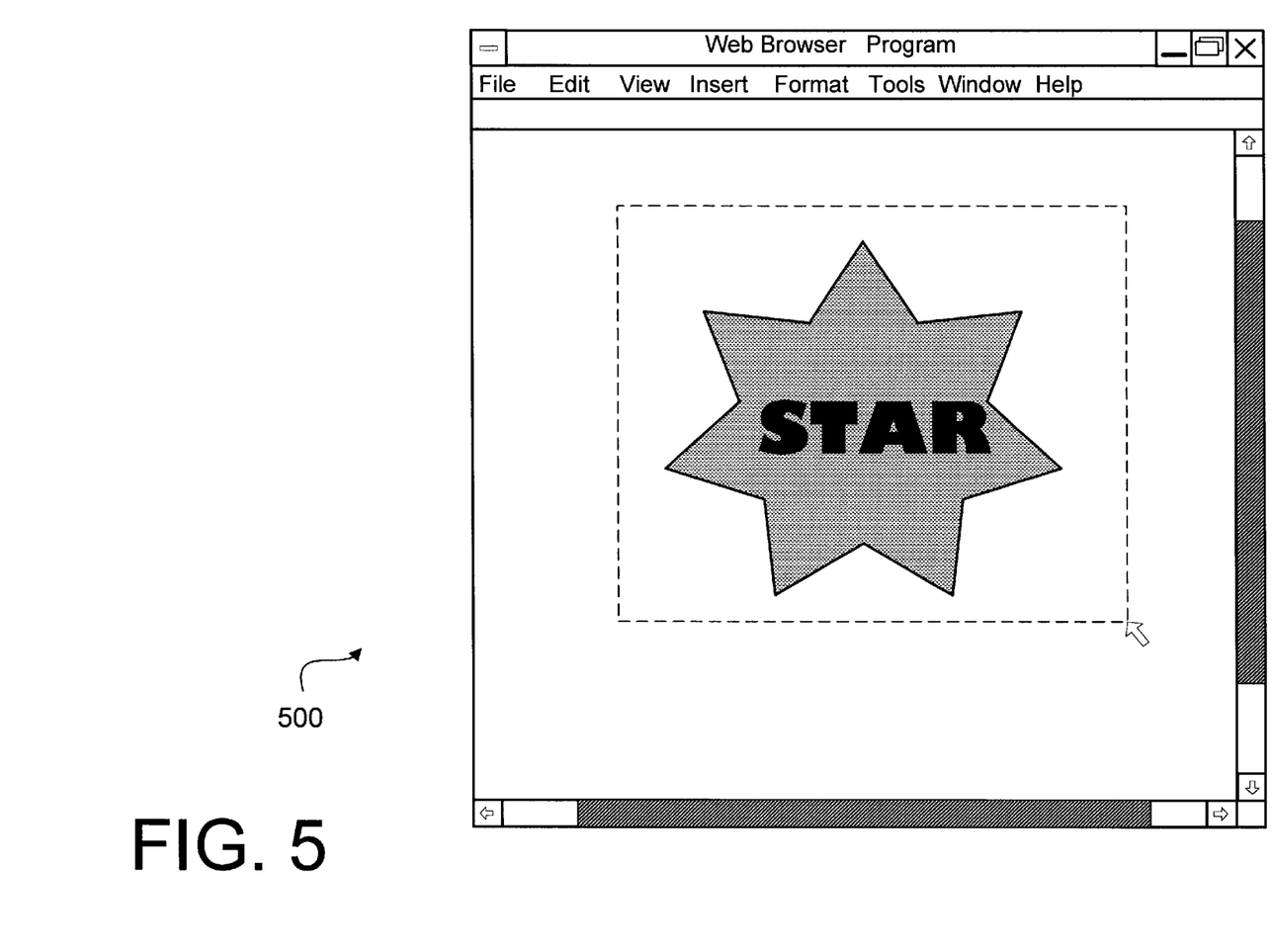
Figure 6:
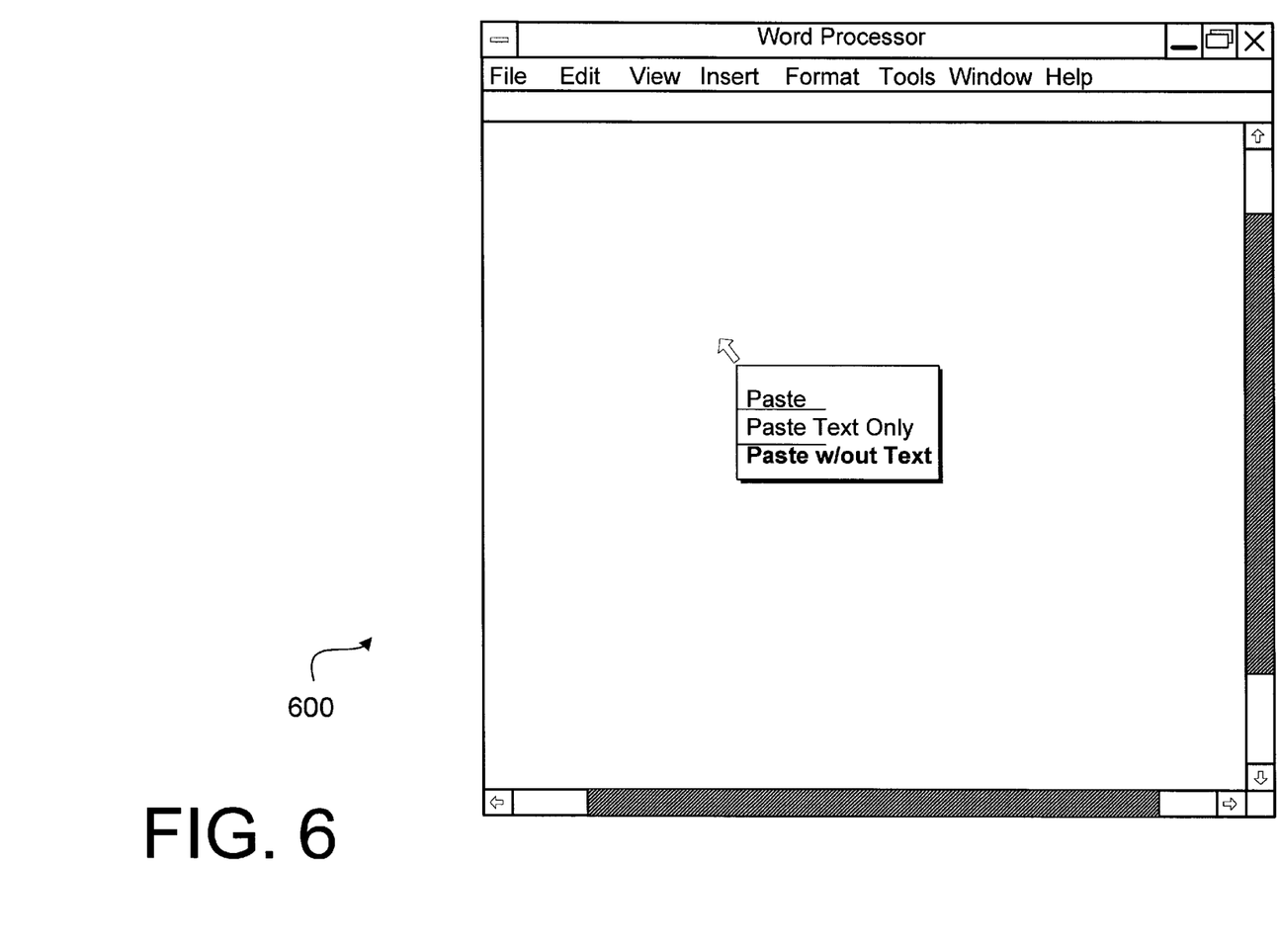
Figure 7:
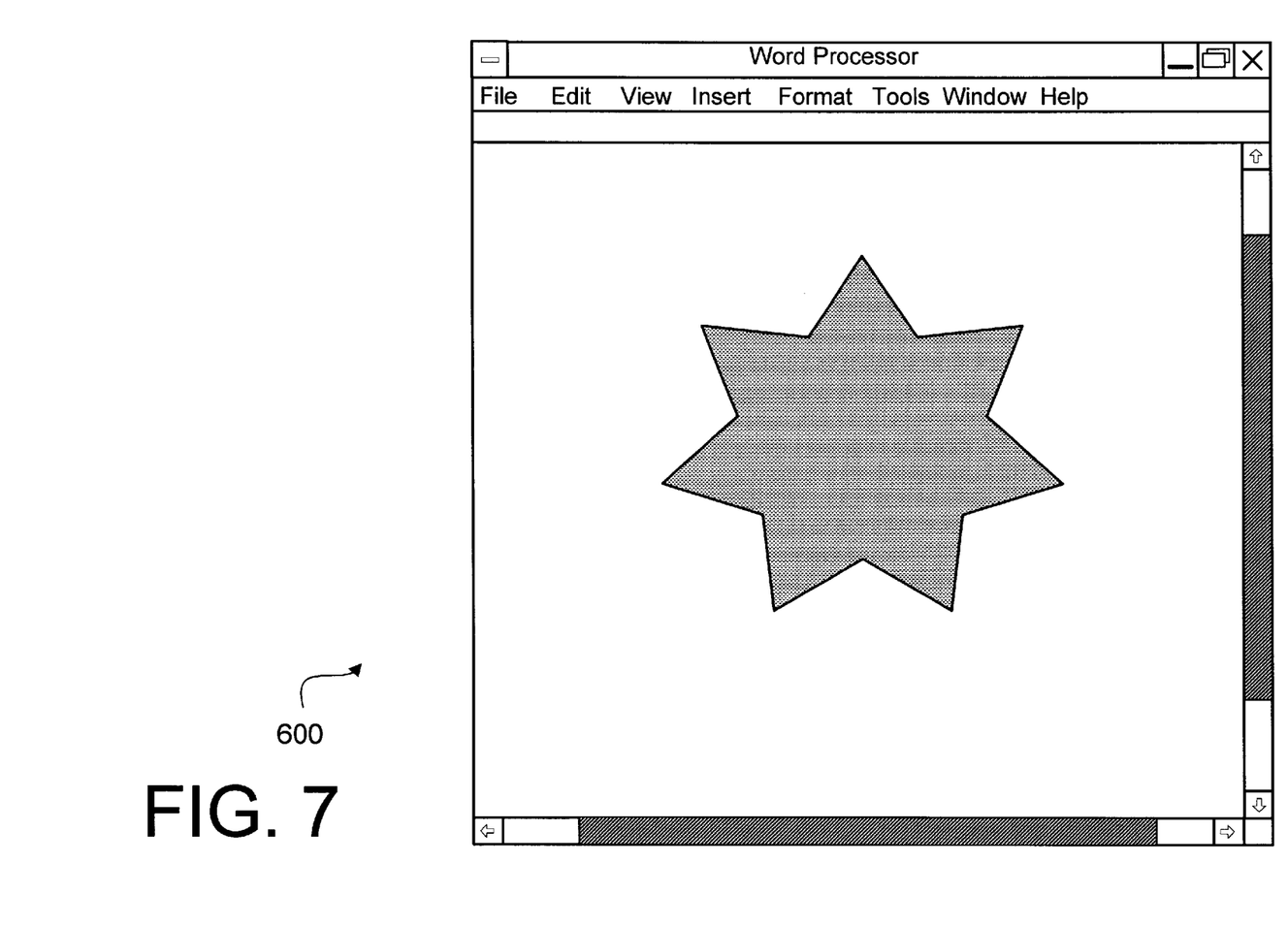

Turning now to FIGS. 5, 6 and 7, the embodiments of the present invention facilitating pasting of images with the text removed will now be illustrated. FIG. 5 illustrates an exemplary user interface 500 that incorporates a text extractor, image editor and intelligent pasting agent in accordance with the preferred embodiment. Specifically, FIG. 5 illustrates how an application program is used to copy or cut data from a source document. In FIG. 5, the user is attempting to copy the image containing the word "STAR" from a web page by drawing a selection box around the image, and then copying or cutting the selected material. Again, as with conventional systems, the user performs a cut or copy by selecting the material, typically with a pointing device such as a mouse. The "cut" or "copy" command is then activated by using the proper keystroke, pull down menu, and/or pointing device button. The selected data is the then copied into the memory buffer for this purpose, sometimes referred to as a "clipboard."

Turning now to FIG. 6, a user interface 600 belonging to a word processor is illustrated. In this example, the preferred embodiment text extractor, image editor and intelligent pasting agent provide the ability to paste the copied image with the text removed. In the illustrated example, a pop-up menu is illustrated giving the user the ability to select a normal "Paste", a "Paste Text", or a "Paste w/out Text" command. When the "Paste w/out Text" command is selected, the text extractor of the preferred embodiment performs an OCR of the stored image. This OCR locates and determines the content of any text that is within the image itself. The image editor then removes the text from the image, and dithers or otherwise replaces the removed text with material that is as compatible as possible with the surrounding area of the image. Thus, the image editor will automatically draw over the text removed areas with patterns that match the surrounding area using any suitable technique. The intelligent pasting agent then pastes the modified image into the destination document. Thus, the user is able to copy the image and automatically remove and replace the text from the image.

Turning now to FIG. 7, the user interface 600 is illustrated after the modified image has been copied into the destination document by the preferred embodiment of the present invention.

In other embodiments, the choice is provided when the copy or cut is performed. For example, the user interface can give the user the option of performing a "copy", "copy text only" or "copy w/out text". Here, the "copy text only" command would automatically extract any text in the selected image and copy only the text into the clipboard. Likewise, the "copy w/out text" command would copy the image, remove the text, dither over the removed text and copy the modified image into the clipboard. A paste command would then paste the contents of the clipboard into the destination document.

The preferred embodiment of the present invention thus provides a method and apparatus for copying images from a source document to a destination document in a computer user interface. The preferred embodiment provides a user interface that gives the user the option to cut or copy information from an image and extract the textual information from the copied image. The extracted text can then be pasted into the destination document as text. Thus, textual information from an image can easily and automatically be copied into text portions of the destination document. Alternatively, the image with the text removed can be copied into the destination in one cut and paste operation.

While the invention has been particularly shown and described with reference to an exemplary embodiment in a windowing graphical user interface, those skilled in the art will recognize that the preferred embodiments can be applied to various other types of user interfaces, and that various changes in form and details may be made therein without departing from the spirit and scope of the invention.

What is claimed is:

1. An apparatus comprising:
   at least one processor;
   a memory coupled to the at least one processor;
   a program residing in the memory, said program providing a user interface, a text extractor, a pasting agent, and an image editor, wherein the text extractor determines textual content within a copied image, wherein the pasting agent provides an automatic extraction of the textual content from the copied image, and pastes the textual content when a destination document is limited to text only, wherein the image editor provides the ability to edit portions of the copied image, where textual content exists such that the textual content is automatically removed from the copied image and automatically drawn over an area from which the textual content had been removed with a pattern that matches a region surrounding said area, and wherein the pasting agent provides the ability to paste the edited image when a paste without text operation is performed.

2. The apparatus of claim 1 wherein the user interface provides a user the ability to selectively paste, paste text only, or paste without text.

3. The apparatus of claim 1 wherein the image editor edits portions of the copied image by dithering over the portions of the copied image where textual content exists.

4. An apparatus comprising:
   at least one processor;
   a memory coupled to the at least one processor; and
   a program residing in the memory, said program providing a user interface, a text extractor and a pasting agent, wherein the text extractor determines textual content within a copied image, wherein the pasting agent provides an automatic extraction of the textual content from the copied image, wherein the pasting agent pastes the determined textual content when a paste operation is performed, and wherein the pasting agent dynamically determines if a destination of the paste command is limited to text-only and automatically pastes the determined textual content if the destination is limited to text only such that that the textual content is automatically removed from the copied image and automatically drawn over an area from which the textual content had been removed with a pattern that matches a region surrounding said area.

5. The apparatus of claim 4, wherein the user interface provides a user the ability to selectively paste or paste text only.

6. The apparatus of claim 4, wherein the user interface provides a user the ability to selectively copy or copy text only.

7. The apparatus of claim 4, wherein the text extractor comprises an optical character recognition system that scans the copied image for the textual content information and determines the textual content.

8. A method for moving data from a source document to a destination document, the method comprising the steps of:
   a) copying an image from the source document;
   b) automatically extracting the copied image for textual content;
   c) automatically drawing, over an area from which the textual content had been removed, with a pattern that matches a region surrounding said area;
   d) pasting the extracted textual content into the destination document; and
   e) determining if a copying location on the destination document is limited to text only, wherein the step of pasting the textual content into the destination document occurs automatically if the pasting location on the destination document is limited to text only.

9. The method of claim 8 wherein the step of scanning the copied image for textual content comprises performing optical character recognition on the copied image.

10. The method of claim 8 wherein the step of copying the textual content into the destination document occurs in response to a paste text only operation.

11. The method of claim 8 further comprising the step of providing a user the ability to selectively paste or paste text only.

12. The method of claim 8 further comprising the step of providing a user the ability to selectively copy or copy text only.

13. A method for moving data from a source document to a destination document, the method comprising the steps of:
   a) copying an image from the source document;
   b) automatically extracting the copied image for textual content;
   c) automatically drawing, over an area from which the textual content had been removed, with a pattern that matches a region surrounding said area;
   d) editing the copied image where textual content exists such that the textual content is automatically removed from the copied image; and
   e) automatically pasting the edited image into the destination document, without requiring any input and direction from a user.

14. The method of claim 13 wherein the step of scanning the copied image for textual content comprises performing optical character recognition on the copied image.

15. The method of claim 13 wherein the step of copying the edited image into the destination document occurs in response to a paste without text operation.

16. The method of claim 13 further comprising the step of providing a user the ability to selectively paste or paste without text.

17. The method of claim 13 further comprising the step of providing a user the ability to selectively copy or copy without text.

18. A program product comprising:
   (A) a program, said program providing a user interface a text extractor and a pasting agent, and wherein the text extractor determines textual content within a copied image, wherein the pasting agent provides an automatic extraction of the textual content from the copied image, and wherein the pasting agent pastes the determined textual content when a paste operation is performed such that that the textual content is automatically removed from the copied image and automatically drawn over an area from which the textual content had been removed with a pattern that matches a region surrounding said area; and (B) signal bearing media bearing said program, wherein the pasting agent dynamically determines if a destination of the paste command is limited to text-only and automatically pastes the determined textual content if the destination is limited to text only.

19. The program product of claim 18, wherein said signal bearing media comprises recordable media.

20. The program product of claim 18 wherein said signal bearing media comprises transmission media.

21. The program product of claim 18 wherein the user interface provides a user the ability to selectively paste or paste text only.

22. The program product of claim 18, wherein the user interface provides a user the ability to selectively copy or copy text only.

23. The program product of claim 18, wherein the text extractor comprises an optical character recognition system that scans the copied image for the textual content information and determines the textual content.

24. A program product comprising:
   (A) a program, said program providing a user a text extractor and a pasting agent, and wherein the text extractor determines textual content within a copied image, wherein the pasting agent provides an automatic extraction of the textual content from the copied image, and wherein the pasting agent pastes the determined textual content when a paste operation is performed; and
   (B) signal bearing media bearing said program, wherein the user interface further comprises an image editor, wherein the image editor provides the ability to edit portions of the copied image where textual content exists such that the textual content is effectively removed from the copied image, and wherein the pasting agent provides the ability to paste the edited image when a paste without text operation is performed such that that the textual content is automatically removed from the copied image and automatically drawn over an area from which the textual content had been removed with a pattern that matches a region surrounding said area.

25. The program product of claim 24 wherein the user interface provides a user the ability to selectively paste, paste text only, or paste without text.

26. The program product of claim 24 wherein the image editor edits portions of the copied image by dithering over the portions of the copied image where textual content exists.

27. An apparatus comprising:
   a) at least one processor;
   b) a memory coupled to the at least one processor; and
   c) a computer program residing in the memory, said computer program providing a user interface, the user interface comprising:
      i) a text extractor, the text extractor determining textual content within a copied image;
      ii) an image editor, the image editor providing the ability to edit portions of the copied image where textual content exists such that the textual content is automatically removed from the copied image; and
      iii) a pasting agent, the pasting agent pasting the determined textual content when a paste without text operation is performed, the pasting agent pasting the copied image without text when a paste without text operation is performed, wherein the pasting agent automatically pastes the determined textual content when the destination is limited to text only.

28. The apparatus of claim 27 wherein the user interface provides a user the ability to selectively paste or paste text only.

29. The apparatus of claim 27 wherein the user interface provides a user the ability to selectively copy or copy text only.

30. The apparatus of claim 27 wherein the pasting agent dynamically determines if a destination of the paste command is limited to text-only.

31. A program product comprising:
   (A) a program, said program providing a user interface, the user interface comprising:
      i) a text extractor, the text extractor determining textual content within a copied image;
      ii) an image editor, the image editor providing the ability to edit portions of the copied image where textual content exists such that the textual content is automatically removed from the copied image; and
      iii) a pasting agent, the pasting agent pasting the determined textual content when a paste without text operation is performed, the pasting agent pasting the copied image without text when a paste without text operation is performed, wherein the pasting agent automatically pastes the determined textual content when the destination is limited to text only; and
   (B) signal bearing media bearing said program.

32. The program product of claim 31 wherein said signal bearing media comprises recordable media.

33. The program product of claim 31 wherein said signal bearing media comprises transmission media.

34. The program product of claim 31 wherein the user interface provides a user the ability to selectively paste or paste text only.

35. The program product of claim 31 wherein the user interface provides a user the ability to selectively copy or copy text only.

36. The program product of claim 31 wherein the pasting agent dynamically determines if a destination of the paste command is limited to text-only.

* * * * *